United States Patent [19]

Lawson

[11] Patent Number: 5,609,979
[45] Date of Patent: Mar. 11, 1997

[54] SPHEROIDAL PARTICLES USEFUL FOR ELECTROSTATOGRAPHY

[75] Inventor: Terence M. Lawson, Aldgate, Australia

[73] Assignee: Research Laboratories of Australia Pty Ltd., State of South Australia, Australia

[21] Appl. No.: 290,751

[22] PCT Filed: Feb. 10, 1993

[86] PCT No.: PCT/AU93/00051

§ 371 Date: Aug. 15, 1994

§ 102(e) Date: Aug. 15, 1994

[87] PCT Pub. No.: WO93/16415

PCT Pub. Date: Aug. 19, 1993

[30] Foreign Application Priority Data

Feb. 14, 1992 [AU] Australia ............... PL 0870

[51] Int. Cl.⁶ .................................................. G03G 9/08
[52] U.S. Cl. ..................... 430/109; 430/111; 430/113; 430/137
[58] Field of Search ................... 430/109, 111, 430/113, 137

[56] References Cited

U.S. PATENT DOCUMENTS

| | | | |
|---|---|---|---|
| 4,794,066 | 12/1988 | Taggi et al. | 430/137 |
| 5,017,451 | 5/1991 | Larson | 430/137 |
| 5,270,445 | 12/1993 | Hou | 430/137 |

FOREIGN PATENT DOCUMENTS

| | | |
|---|---|---|
| 280789 | 9/1988 | European Pat. Off. |
| 0431375 | 6/1991 | European Pat. Off. |
| 386839 | 1/1965 | Germany. |
| 3821481 | 12/1989 | Germany. |
| 2133571 | 7/1984 | United Kingdom. |

OTHER PUBLICATIONS

Patent Abstracts of Japan, vol. 12, No. 233 (p–724) (3080), Jul. 5, 1988 & JP–A–63 025 663 (Toyo Ink) Feb. 3, 1988–Abstract.

Patent Abstracts of Japan, vol. 11, No. 268 (c–444) (2715), Aug. 29, 1987 & JP–A–62 072 727 (Konishiroku) Apr. 3, 1987–Abstract.

Patent Abstracts of Japan, vol. 9, No. 186 (p–377) (1909), Aug. 2, 1985 & JP–A–60 057 350 (Showa Denko) Apr. 3, 1985–Abstract.

Patent Abstracts of Japan, vol. 16, No. 117 (p–1328), Mar. 24, 1992 & JP–A–03 287 174 (Dainippon Printing) Dec. 17, 1991–Abstract.

*Primary Examiner*—Kathleen Duda
*Attorney, Agent, or Firm*—Evenson, McKeown, Edwards & Lenahan, P.L.L.C.

[57] ABSTRACT

A method of production of microparticles of a thermoplastic polymer suitable as a toner for electrostatographic processes comprising the steps of melting the material in a continuous non-solvent phase having a boiling point higher than the melting point of the thermoplastic polymer, mixing the thermoplastic polymer in the continuous phase to produce an emulsion, and cooling the emulsion to produce a dispersion of solid microparticles of the thermoplastic polymer in the continuous phase. The thermoplastic polymer may include pigments or dyes to provide colored toner particles. A surface active agent may be used to control particle size.

14 Claims, No Drawings ly, the acrylic emulsion may be used with suitable solvents available commercially such as are available under the trade marks ISOPAR G, ISOPAR H, ISOPAR K and ISOPAR L. In the case where the particles are to be used as dry toners, they may be mixed with further additives such as colloidal silica or similar material known in the art to enhance flow properties of dry toner. Similarly in the case of liquid toners they may be mixed with further charge directors, either anionic, cationic or non-ionic to assist in charging the toner particles to a particular polarity.

SPHEROIDAL PARTICLES USEFUL FOR ELECTROSTATOGRAPHY

This invention relates to the production of microparticles particularly for electrostatographic processes.

BACKGROUND OF THE INVENTION

Prior art electrostatographic processes are known, such as photocopying and the like in which microscopic particles are attracted to latent images in the form of discrete electrostatic charges on the surface of a suitable recording member. Such microscopic particles, usually known as toner particles, may be applied to the surface to be toned in dry powder form, or as a suspension in an insulating liquid, usually a relatively high boiling point aliphatic hydrocarbon liquid or the like.

Many methods have been proposed for the production of such toners, both dry and liquid dispersed. Toner particles in the general sense normally contain at least a pigment or dye and a binder, such as a natural or synthetic resin or polymeric material. The so-called dry toners may also have admixed therewith flow improving agents such as colloidal silica or the like to enhance their functionality in the various toner applications in use, and in addition may be mixed with so-called carrier particles, usually magnetic, which act to transport the toner to the point of application. Such carrier particles are selected to bear the correct triboelectric relationship with the toner particles to allow correct toning functionality. Normal production methods are many and varied, the most common involving hot melt mixing followed by cooling, pulverising and grinding to obtain particles of the correct particle size, normally 1 to 10 microns mean diameter. Such processes are energy inefficient and in addition environmentally unattractive due to dust generation. A further problem exists that particles produced by such processes are not necessarily spheroidal and hence do not flow well in use.

Microencapsulation techniques have also been proposed to produce more or less spherical particles, but such processes are also energy inefficient as they normally involve spray drying of water slurries of quite low solids content.

Liquid dispersed toners can generally be produced using techniques which are more energy efficient and with no significant dusting problems. However, liquid dispersed toners of the prior art normally contain other materials in addition to the colouring matter and binder resin or polymer. Such materials include surfactants, stabilisers, charge modifiers and the like, and in many instances the binder resin or polymer is partly soluble in the dispersant or carrier liquid.

It is the object of the present invention to overcome these and other problems relating to the production of both dry and liquid dispersed electrostatographic toner particles.

SUMMARY OF THE INVENTION

In one form therefore the invention is said to reside in a method of production of microparticles of a material suitable as a toner for electrostatographic processes wherein the material is or includes a thermoplastic polymer, the method comprising the steps of melting the material in a continuous phase having a boiling point higher than the melting point of the material, the material being non-soluble in the continuous phase, mixing the material in the continuous phase to produce an emulsion and cooling the emulsion to produce a dispersion of solid microparticles of the material in the continuous phase.

Hence it can be seen that the present invention involves the mechanical emulsification of melted thermoplastic polymers into an incompatible non-solvent continuous phase. The action of surface tension forces in the emulsion of the material in liquid phase supported in the incompatible liquid continuous phase will allow spherical particles to be produced.

In a preferred form particularly where dry toners are to be produced the invention may include the further step of separating the microparticles so produced from the liquid.

Preferably there may be further included a surface active agent in the continuous phase which will assist in controlling or regulating the particle size of the microparticles. The surface active agent may be selected from non-ionic, anionic or cationic surface active agents and is preferably soluble in the continuous phase and is substantive to the surface of the material.

The material to be dispersed within the continuous phase may be ketone condensates, epoxy resins, polystyrene, vinyl acetate, vinyl chlorides, polyesters or mixtures or copolymers of these.

The continuous phase may be selected from mineral oils, silicone fluids, water, aromatic or aliphatic esters, fluorsilicone oils and biphenyls.

The thermoplastic polymer material may include colouring matter.

The microparticle so produced may have a size range of from 2 to 10 micrometers and may be substantially spheroidal.

DESCRIPTION OF A PREFERRED EMBODIMENT OF THE INVENTION

In order to produce thermoplastic toner particles in accordance with a preferred embodiment of the present invention the following process steps are involved. The selected thermoplastic material with a high melt index is added to a liquid continuous phase which is a total non-solvent for the thermoplastic at any relevant temperature. The incompatible mixture is then heated to a temperature sufficiently above the melting point of the thermoplastic to produce a low viscosity melt. An appropriate surface active agent may be added and the thermoplastic material is then emulsified at that temperature in a mixer or homogeniser such as a Ross mixer.

Upon complete emulsification of the discrete phase, heat is removed and the emulsion allowed to cool with continued stirring. The resultant cream consists of discrete solid thermoplastic particles, substantially spheroidal in form and stably dispersed in an inert continuum.

It will be realised that the thermoplastic polymer may include the various components useful for electrostatography. These may include colorants.

Subsequent optional process steps may be applied in accordance with the required end use of the discrete thermoplastic particles. For example, by proper selection of surface active agent in a charge director capacity and the continuous phase, the emulsion may be used with suitable dilution as a conventional liquid toner. Alternatively the particles in the emulsion may be removed by dilution of the continuous phase with large volumes of compatible non-solvent for the discrete phase, followed by sedimentation, centrifuging or filtration. Such separated particles may be either redispersed in a suitable vehicle to produce a conventional liquid toner or used as a dry toner.

Dispersions of the type herein described may be modified by the inclusion of colouring matter at the melt stage of the thermoplastic polymer. Such colouring matter could be organic or inorganic pigments or dyestuffs. If magnetic iron oxide is the selected pigment single component magnetic dry toner could thus be produced.

The invention will now be discussed in detail with relation to a number of non-limiting examples.

EXAMPLE 1

A vessel was charged with 500 gms of Energol WM-6, a white paraffin oil having a viscosity of approximately 70 centipoise at 20° C. The oil was heated to 140°–150° C. and into this was dissolved 5 gms of Ganex V216, an alkylated polyvinyl pyrrolidone suffactant. To this solution was added 100 gms of Araldite GT7014, an epoxy resin with an epoxide value of 1100 and melting point of approximately 104° C. Once the epoxy resin had melted, a high speed emulsifier was used to emulsify the resin into the hot incompatible oil. A low viscosity white emulsion resulted which upon cooling to below the melting point of the resin became a white creamy emulsion of solid epoxy resin in oil. This cream upon dilution with Isopar G, an isoparaffin with a boiling range of 155°–177° C., was able to render visible an electrostatic charge image on a zinc oxide photoconductor. The particles forming the image deposit were heat fusible and before fusion were shown by scanning electron microscopy [SEM] to be completely spherical with a majority particle size of 2–5 microns.

EXAMPLE 2

The procedure described in Example 1 was repeated with the following exception: instead of Araldite GT7014, Kunstharz SK, a ketone-aldehyde condensate polymer with a melting point of approximately 100° C. was used. A yellowish creamy emulsion resulted which, as in Example 1, was capable of rendering visible a latent electrostatic image. SEM showed unfused spherical particles to be in the range of 0.5 to 10 microns.

EXAMPLE 3

The procedure described in Example 1 was repeated with the following exception: instead of Araldite GT7014, Uralac P2228, a carboxylated polyester resin with a melting point of approximately 100° C. was used. As in Example 1, a white emulsion of spherical particles results, which was capable of developing a latent electrostatic image. SEM showed the unfused spherical particles to be in the range of 2–5 microns.

EXAMPLE 4

The procedure described in Example 1 was repeated with the following exceptions: instead of Araldite GT7014, Epikote 1001, an epoxy resin with an epoxide number of 450 and a melting point of approximately 70° C. was used. 300 gms of isopar M, an isoparaffin with a boiling range of 210°–255° C. was used instead of the Energol WM6, and additionally, 25 gms of Microlith blue 4GT, a resin dispersed phthalocyanine blue pigment was incorporated during the emulsification stage. Upon cooling, a blue emulsion of creamy consistency was achieved. This emulsion was, as that of Example 1, capable of rendering visible a latent electrostatic image. The unfused spherical particles had the blue pigment incorporated in them and were in the size range of 2–10 microns.

The availability of the materials used in the aforegoing examples is as follows:

Energol WM6, product of BP Australia.
Ganex V216, product of GAF Corporation, USA.
Araldite GT7014, product of Ciba Geigy, Switzerland.
Kunstharz SK, product of Huls AG, Germany.
Uralac P2228, product of DSM Resins BV, Netherlands.
Epikote 1001, product of Shell Chemicals, Australia.
Microlith blue 4GT, product of Ciba Geigy, Switzerland.
Isopar G, M, products of Exxon Corporation, USA.

It will be seen that by the action of surface tension forces on one liquid supported in an incompatible liquid microparticles are produced which are substantially spheroidal and hence will have good flow characteristics.

I claim:

1. A method of production of spheroidal microparticles of a material suitable as a toner for electrostatographic processes wherein the material comprises a thermoplastic polymer, the method comprising the steps of, melting the material in a non-aqueous continuous phase having a boiling point higher than the melting point of the material, the material being non-soluble in the continuous phase, adding a surface active agent to control or regulate particle size of the microparticles, mixing the material in the continuous phase to produce an emulsion, and cooling the emulsion to produce a dispersion of solid microparticles of the material in the continuous phase, wherein the continuous phase is a low viscosity liquid paraffin.

2. A method of production of microparticles as in claim 1 further including the step of separating the microparticles from the continuous phase.

3. A method of production of microparticles as in claim 1 wherein the surface active agent is selected from the group consisting of non-ionic, anionic and cationic surface active agents and which is soluble in the continuous phase.

4. A method of production of microparticles as in claim 1 wherein the material is selected from the group consisting of ketone condensates, epoxy resins, polystyrene, vinyl acetate, vinyl chloride, polyesters and mixtures or copolymers of these.

5. A method of production of microparticles as in claim 1 wherein the material further includes colouring matter.

6. A method as in claim 1 wherein the microparticles have a size range of from 2–10 microns.

7. A method as in claim 1 wherein the microparticles are substantially spheroidal.

8. Microparticles of a material produced by the method of claim 1.

9. Microparticles of a material produced by the method of claim 2.

10. Microparticles of a material produced by the method of claim 3.

11. Microparticles of a material produced by the method of claim 4.

12. Microparticles of a material produced by the method of claim 5.

13. Microparticles of a material produced by the method of claim 6.

14. Microparticles of a material produced by the method of claim 7.

* * * * *